(12) United States Patent
Chen et al.

(10) Patent No.: US 11,710,041 B2
(45) Date of Patent: Jul. 25, 2023

(54) FEATURE MAP AND WEIGHT SELECTION METHOD AND ACCELERATING DEVICE

(71) Applicant: Shanghai Cambricon Information Technology Co., Ltd., Pudong New Area (CN)

(72) Inventors: Tianshi Chen, Pudong New Area (CN); Yifan Hao, Pudong New Area (CN); Shaoli Liu, Pudong New Area (CN)

(73) Assignee: SHANGHAI CAMBRICON INFORMATION TECHNOLOGY CO., LTD, Shanghai (CN)

( * ) Notice: Subject to any disclaimer, the term of this patent is extended or adjusted under 35 U.S.C. 154(b) by 829 days.

(21) Appl. No.: 16/699,029

(22) Filed: Nov. 28, 2019

(65) Prior Publication Data

US 2020/0097806 A1    Mar. 26, 2020

Related U.S. Application Data

(63) Continuation of application No. 16/699,027, filed on Nov. 28, 2019, which is a continuation-in-part of (Continued)

(30) Foreign Application Priority Data

Jun. 16, 2017    (CN) .......................... 201710456759.4

(51) Int. Cl.
*G06N 3/08* (2023.01)
*G06F 9/38* (2018.01)
(Continued)

(52) U.S. Cl.
CPC ........... *G06N 3/082* (2013.01); *G06F 1/3296* (2013.01); *G06F 9/3877* (2013.01);
(Continued)

(58) Field of Classification Search
CPC .......... G06F 12/0875; G06F 2212/452; G06N 3/063; G06N 3/082
See application file for complete search history.

(56) References Cited

U.S. PATENT DOCUMENTS

2016/0358069 A1* 12/2016 Brothers ................. G06F 7/764
2018/0114114 A1*  4/2018 Molchanov ............ G06N 3/084

FOREIGN PATENT DOCUMENTS

CN        105512723 A    4/2016
CN        106485316 A    3/2017
(Continued)

OTHER PUBLICATIONS

Judd, Patrick, et al. "Cnvlutin2: Ineffectual-activation-and-weight-free deep neural network computing." arXiv preprint arXiv: 1705.00125 (2017). (Year: 2017).*
(Continued)

*Primary Examiner* — Benjamin P Geib
(74) *Attorney, Agent, or Firm* — Getech Law LLC; Jun Ye

(57) ABSTRACT

The present disclosure provides a processing device including: a coarse-grained pruning unit configured to perform coarse-grained pruning on a weight of a neural network to obtain a pruned weight, an operation unit configured to train the neural network according to the pruned weight. The coarse-grained pruning unit is specifically configured to select M weights from the weights of the neural network through a sliding window, and when the M weights meet a preset condition, all or part of the M weights may be set to 0. The processing device can reduce the memory access while reducing the amount of computation, thereby obtaining an acceleration ratio and reducing energy consumption.

19 Claims, 9 Drawing Sheets

Related U.S. Application Data application No. PCT/CN2018/088033, filed on May 23, 2018.

(51) Int. Cl.

| | | |
|---|---|---|
| *G06F 13/16* | (2006.01) | |
| *G06N 3/04* | (2023.01) | |
| *G06N 3/063* | (2023.01) | |
| *G06F 12/0875* | (2016.01) | |
| *G06F 16/28* | (2019.01) | |
| *G06F 1/3296* | (2019.01) | |
| *G06N 3/082* | (2023.01) | |
| *G06N 3/084* | (2023.01) | |
| *G06N 3/044* | (2023.01) | |
| *G06N 3/048* | (2023.01) | |

(52) U.S. Cl.
CPC ......... *G06F 12/0875* (2013.01); *G06F 13/16* (2013.01); *G06F 16/285* (2019.01); *G06N 3/04* (2013.01); *G06N 3/044* (2023.01); *G06N 3/048* (2023.01); *G06N 3/063* (2013.01); *G06N 3/084* (2013.01); *G06F 2212/452* (2013.01); *G06F 2213/0026* (2013.01)

(56) References Cited

FOREIGN PATENT DOCUMENTS

| CN | 106548234 A | 3/2017 |
|---|---|---|
| CN | 106919942 A | 7/2017 |
| CN | 106991477 A | 7/2017 |

OTHER PUBLICATIONS

Mao, Huizi, et al. "Exploring the regularity of sparse structure in convolutional neural networks." arXiv preprint arXiv: 1705.08922 (2017). (Year: 2017).*

Parashar, Angshuman, et al. "SCNN: An Accelerator for Compressed-sparse Convolutional Neural Networks." arXiv preprint arXiv: 1708.04485 (2017). (Year: 2017).*

Han, Song, et al. "EIE: Efficient Inference Engine on Compressed Deep Neural Network." arXiv preprint arXiv: 1602.01528 (2016). (Year: 2016).*

Zeng Dan et al.: "Compressing Deep Neural Network for Facial Landmarks Detection", International Conference on Financial Cryptography and Data Security, Nov. 13, 2016, 11 Pages.

Song Han et al.; "Deep Compression: Compressing Deep Neural Networks with Pruning, Trained Quantization and Huffman D2 Coding", Internet: URL:https://arxiv.org/pdf/1510.00149v5.pdf; Feb. 15, 2016; 14 pages.

Fujii Tomoya et al.; "An FPGA Realization of a Deep Convolutional Neural Network Using a Threshold Neuron Pruning", International Conference on Financial Cryptography and Data Security; Mar. 31, 2017; 13 pages.

Sun Fangxuan et al.; "Intra-layer nonuniform quantization of convolutional neural network" 2016 8th International Conference on Wireless Communications & Signal Processing (WCSP), IEEE, Oct. 13, 2016, 5 pages.

Song Han et al.: "ESE: Efficient Speech Recognition Engine with Sparse LSTM on FPGA", Proceedings of the 2017 ACM/SIGDA International Symposium on Field-Programmable Gate Arrays; Feb. 17, 2017; 10 pages.

Sajid Anwar et al.; "Structured Pruning of Deep Convolutional Neural Networks", ACM Journal on Emerging Technologies in Computing Systems; Feb. 9, 2017, 18 pages.

Yunchao Gong et al.; "Compressing Deep Convolutional Networks using Vector Quantization", Internet: URL:https://arxiv.org/pdf/1412.6115.pdf; Dec. 18, 2014, 10 pages.

Kadetotad Deepak et al.; "Efficient memory compression in deep neural networks using coarse-grain sparsification for speech applications", 2016 IEEE/ACM International Conference on Computer-Aided Design, Nov. 7, 2016, 8 pages.

Song Han et al.; "Leraning both weights and connections for efficient neural networks" Published as a conference paper at NIPS 2015; Internet URL: https://arxiv.org/abs/1506.02626; Oct. 30, 2015; 9 pages.

EP 18806558.5, European Search Report dated Apr. 24, 2020, 13 pages.

EP 19214007.7, European Search Report dated Apr. 15, 2020, 12 pages.

EP 19214010.1, European Search Report dated Apr. 21, 2020, 12 pages.

EP 19214015.0, European Search Report dated Apr. 21, 2020, 14 pages.

Moons, Bert, et al. "Energy-Efficient ConvNets Through Approximate Computing", arXiv: 1603.06777v1, Mar. 22, 2016, 8 pages.

EP 19 214 010.1, Communication pursuant to Article 94(3), dated Jan. 3, 2022, 11 pages.

Huang, Hongmei, et al., "Fault Prediction Method Based on RBF Network On-Line Learning", Journal of Nanjing University of Aeronautics & Astronautics, vol. 39 No. 2, Apr. 2007, 4 pages.

CN 201710370905.1—Second Office Action, dated Mar. 18, 2021, 11 pages. (with English translation).

CN 201710583336.9—First Office Action, dated Apr. 23, 2020, 15 pages. (with English translation).

CN 201710677987.4—Third Office Action, dated Mar. 30, 2021, 16 pages. (with English translation).

CN 201710678038.8—First Office Action, dated Oct. 10, 2020, 12 pages. (with English translation).

CN 201710689666.6—First Office Action, dated Jun. 23, 2020, 19 pages. (with English translation).

CN 201710689666.6—Second Office Action, dated Feb. 3, 2021, 18 pages. (with English translation).

Cn 201710689595.X—First Office Action, dated Sep. 27, 2020, 21 pages. (with English translation).

Liu, Shaoli, et al., "Cambricon: An Instruction Set Architecture for Neural Networks", ACM/IEEE, 2016, 13 pages.

Cn 201710689595.X—Second Office Action, dated Jun. 6, 2021, 17 pages. (with English translation).

EP 18 806 558.5, Communication pursuant to Article 94(3), dated Dec. 9, 2021, 11 pages.

EP 19 214 007.7, Communication pursuant to Article 94(3), dated Dec. 8, 2021, 10 pages.

EP 19 214 015.0, Communication pursuant to Article 94(3), dated Jan. 3, 2022, 12 pages.

PCT/CN2018/088033—Search Report, dated Aug. 21, 2018, 19 pages. (with English translation).

* cited by examiner

FEATURE MAP AND WEIGHT SELECTION METHOD AND ACCELERATING DEVICE

TECHNICAL FIELD

The disclosure relates to the field of data processing technologies, particularly to an operation device, an operation method, and a chip.

BACKGROUND

Artificial neural network (ANN), abbreviated as neural network (NN), is a mathematical model or operation model that simulates the structure and function of a biological neural network. The Artificial neural network has been widely used in many fields, such as image recognition, computer vision, speech recognition, and natural language processing, and has achieved excellent results in these fields.

With the development of the neural network, the network framework is expanding gradually, the network parameters are increasing gradually, and the features of operation intensiveness and memory intensiveness of neural network become more and more obvious. For example, based on Caffe's network architecture, the size of GoogLeNet Caffemodel is about 50 MB, the sizes of AlexNet Caffemodel and ResNet-152 Caffemodel are about 230 MB, and the size of VGG-16 Caffemodel is more than 500 MB, therefore, it is very important to build a neural network with high-efficiency and low-redundancy.

At present, the development of the neural network is mainly limited to the following two aspects. From the aspect of hardware, the operation intensiveness and memory intensiveness of the artificial neural network lead to the high requirement on hardware devices for running the artificial neural network. Now, it is still very difficult to use the Central Processing Unit (CPU) or the Graphic Processing Unit (GPU) to carry out the operations of the artificial neural network, which leads to high overhead of front-end decoding. Take the GPU as an example, since the GPU has only a small on-chip cache, when the neural network operation is being performed, the network model data needs to be repeatedly transmitted from off-chip, a large amount of time is spent on data transmission, which brings huge power consumption, thus the off-chip bandwidth becomes a major performance bottleneck. From the aspect of algorithm, for intensive operations, the amount of memory access is large so that the design of algorithm determines the efficiency of the neural network. Therefore, how to design an efficient artificial neural network to achieve effective output and reduce the amount of operation and memory access, has become a technical problem that needs to be solved during the development of the artificial neural network.

SUMMARY

(1) Technical Problems to be Solved

The disclosure is intended to provide an operation device, an operation method, and a chip to solve at least one of the above-described technical problems.

(2) Technical Solutions

The present disclosure provides an operation device including:

a filtering unit (400) configured to select a feature map and a weight corresponding to the feature map according to a connection array of the feature map composed of an output neuron and an input neuron, and output the feature map and the weight corresponding to the feature map to an operation unit (600); and/or configured to select a row of the feature map and the row of weight corresponding to the row of the feature map according to a connection array of each row in the feature map composed of an output neuron and an input neuron, and output the row of the feature map and the row of weight corresponding to the row of the feature map to the operation unit (600); and/or configured to select a column of the feature map and the weight column corresponding to the column of the feature map according to a connection array of each column in the feature map composed of an output neuron and an input neuron, and output the column of the feature map and the weight column corresponding to the column of the feature map to the operation unit (600).

In an embodiment, the operation unit (600) may be configured to perform a corresponding artificial neural network operation supporting structure clipping on data output by the filtering unit (400) according to an instruction to obtain an output neuron.

Furthermore, a selecting process of the filtering unit (400) may include:

if the weight has not been selected offline, selecting out the feature map and the corresponding weight of the feature map according to the connection array of the feature map composed of the output neuron and the input neuron, and outputting the selected feature map and the corresponding weight of the feature map to the operation unit, and/or selecting out a row/column of the feature map and the corresponding row/column of the weight according to the connection array of row/column of the feature map composed of the output neuron and the input neuron, and outputting the selected row/column of the feature map and the corresponding row/column of the weight to the operation unit;

if the weight has been selected offline, selecting out the feature map according to the connection array of the feature map composed of the output neuron and the input neuron, and outputting the selected feature map to the operation unit, meanwhile, directly outputting the weight after selecting offline to the operation unit without passing by the filtering unit; and/or selecting the row/column of the feature map and the corresponding row/column of the weight according to the connection array of row/column of the feature map composed of the output neuron and the input neuron, and outputting the selected row/column of the feature map and the corresponding row/column of the weight to the operation unit.

Furthermore, the connection array may be configured to represent a connection status between the output neuron and the input neuron, and representations of the connection array may include:

a first representation: taking numbers "0" and "1" to represent the connection status, where "1" means that the output neuron is connected to the input neuron, and "0" means that the output neuron is not connected to the input neuron; or "0" means that the output neuron is connected to the input neuron, and "1" means that the output neuron is not connected to the input neuron; the connection array of the feature map composed of the output neuron and the input neuron is a connection array composed of "0" and "1" of the feature map composed of each output neuron and all input neurons; the connection array of row/column of the feature map composed of the output neuron and the input neuron is a connection array composed of "0" and "1" of the row/column of the feature map composed of each output neuron and all input neurons;

a second representation: taking distance to represent the connection status, the connection array of the feature map composed of the output neuron and the input neuron is an array combining of a distance from the input neuron where a first connection is located to a first input neuron, a distance from the input neuron where a second connection is located to a previous connection in the input neuron, a distance from the input neuron where a third connection is located to the previous connection in the input neuron, . . . , and so on, until all the input neurons connected to the output neuron are exhausted, which is used to represent the corresponding connection status of the output neuron.

Furthermore, elements in the array of the second representation method is non-negative integers.

Furthermore, the feature map and the corresponding weight of the feature map selected for computation by using the connection array of the feature map composed of the output neuron and the input neuron or the connection array of the row/column of the feature map composed of the output neuron and the input neuron, or the row/column of the feature map and the corresponding row/column of the weights meet the following conditions:

the first representation: the elements in the connection array corresponding to the feature map and the corresponding weight of the feature map selected for computing the output neuron are numbers indicating having a connection relation; and/or the elements in the connection array corresponding to the row/column of the feature map and the corresponding row/column of the weight selected for computing the output neuron are numbers indicating having a connection relation;

the second representation: for the connection array Index A corresponding to each output neuron $O_j$, a value of each bit is a non-negative integer, and all the input neurons are $I_1$, $I_2$, . . . , $I_N$, let the input neurons connected to the output neuron be 1 $I_{k_1}$, $I_{k_2}$, . . . , $I_{k_n}$, n≤N, $k_1$, $k_2$, . . . , $k_n \in \{1, 2, . . . , N\}$, and the values are unknown, then Index A has n bits, a value of a first bit is $A_1$, which indicates the distance from the input neuron where the first connection is located to $I_1$; a value of $p^{th}$ bit is $A_p$, p=2, 3, . . . , n, which indicates the distance from the input neuron where the current connection is located to the input neuron where the previous connection is located, therefore the selected input neurons for computing the output neuron $O_j$ are $I_{k_1}$, $I_{k_2}$, . . . , $I_{k_n}$, and the corresponding weights are $W_{k_1 j}$, $W_{k_2 j}$, . . . , $W_{k_n j}$, where $k_1 = A_1 + 1$, $k_p = A_p + k_{p-1}$.

In an embodiment, the operation device may further include a storage unit (100) configured to store data and an instruction, where the data stored in the storage unit (100) may include:

the feature map composed of the input neuron, the weight, the connection array of the feature map composed of the output neuron and the input neuron, the connection array of each row in the feature map composed of the output neuron and the input neuron, the connection array of each column in the feature map composed of the output neuron and the input neuron, the feature map composed of the output neuron, and other data and parameters required for the artificial neural network operation.

In an embodiment, the operation unit (600) may include:
a first part: a multiplier configured to multiply first input data and second input data to obtain a product;

a second part: one or a plurality of adders configured to add the product step by step to obtain a sum, where bias processing may or may not be performed on the sum as needed; and a third part: an active function configured to perform an activation operation on the sum to obtain an output neuron.

Furthermore, the one or a plurality of adders constitute an adder tree.

Further, the operation unit (600) may include a pooling unit configured to perform a pooling operation on input data.

Further, the operation device may include a caching unit (300) configured to cache data and an instruction.

(3) Technical Effects

The operation device, the operation method and the chip provided by the present disclosure have at least one of the following technical effects:

1. Through the filtering unit, the present disclosure realizes a structural clipping, and selects the feature map composed of the input neurons participating in subsequent operation in the artificial neural network after structural clipping and the corresponding weights of the feature map, which may thereby avoid the computational redundancy and memory access redundancy caused by all input neurons and weights participating in network operations, and solve the problem that the CPU and GPU have inadequate operational performance and the front-end decoding overhead is high, therefore the support for the multi-layer artificial neural network operation algorithm may be effectively improved.

2. The present disclosure adopts a dedicated on-chip cache for the multi-layer artificial neural network operation algorithm to fully exploits the reuse of input neurons and weight data, which may avoid repeatedly reading these data into memory, reduce memory access bandwidth, therefore, memory bandwidth may no longer be a bottleneck of the performance of multi-layer artificial neural network operations and training algorithms.

DETAILED DESCRIPTION OF THE EMBODIMENTS

Figure 1:
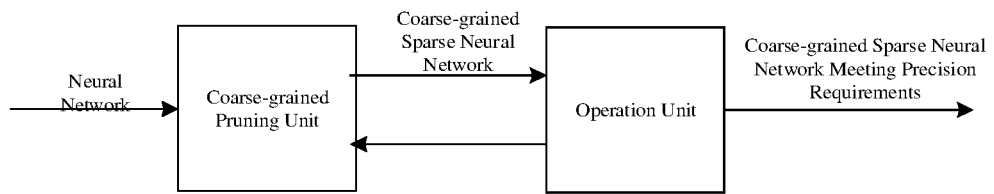
FIG. 1 is a schematic diagram of the function of a filtering unit of an operation device according to an embodiment of the disclosure.

In order to make the purpose, technical solutions, and advantages of the disclosure clearer, the disclosure will further be described below in combination with specific embodiments and with reference to the accompanied drawings in detail.

All of the modules in the embodiment of the disclosure may be hardware structures. Physical implementation of the hardware structures may include but not be limited to physical device, and the physical device may include but not be limited to transistors, memristors, and Deoxyribonucleic Acid (DNA) computers.

It should be noted that "first", "second", "third", etc., used in the present disclosure are only used to distinguish different objects, and do not imply that there is any particular sequential relationship between these objects.

In the present specification, the following embodiments for describing the principle of the present disclosure are merely illustrative and should not be construed in any way as limiting the scope of the disclosure. The following description with reference to the drawings is provided to assist in a comprehensive understanding of the exemplary embodiments of the present disclosure as defined by the claims and the equivalents of the claims. The following description includes various specific details to facilitate the understanding, but these details should be regarded as merely exemplary. Therefore, those of ordinary skill in the art should realize that various changes and modifications of the embodiments described herein can be made without departing from the scope and spirit of the present disclosure. In addition, descriptions of well-known functions and structures are omitted for clarity and conciseness. Moreover, same reference numerals are used for similar functions and operations throughout the drawings. In the present disclosure, the terms "include" and "contain" and derivatives thereof are intended to be inclusive but not limiting.

The meaning of "row/column" in the specification means a row or a column, and a noun with "row/column", a "row" corresponds to a "row", and a "column" corresponds to a "column". For example, the connection array of the row/column of the feature map composed of the input neuron and the output neuron selects out the row/column of the feature map and the corresponding row/column of weight for computation, where the row/column of the feature map and the corresponding weight of the row/column of the feature map represent the following meanings: the connection array of the row of the feature map composed of the output neuron and the input neuron selects out the row of the feature map and the corresponding row of the feature map for computation, or the connection array of the column of the feature map composed of the output neuron and the input neuron selects out the row of the feature map and the corresponding column of the feature map for computation.

The present disclosure provides an operation device, an operation method, and a chip. A filtering unit is set between the input neuron and the output neuron, and the structural clipping is implemented by using a connection array of the feature map composed of the output neuron and the input neuron. The feature map and the corresponding weight of the feature map of the artificial neural network participating in the subsequent operations are selected out after structural clipping, which avoids computation redundancy and memory access redundancy caused by all input neurons and weights participating in the network operation, and solves the problem that the CPU and GPU have inadequate operational performance and the front-end decoding overhead is high, and fully exploits the reusability of input neurons and weights, reduces the memory access bandwidth and the amount of computation and memory, and achieves efficient output.

In order to make the purpose, technical solutions and advantages of the disclosure clearer, the disclosure will further be described below in combination with specific embodiments and with reference to the drawings in detail.

Figure 2:
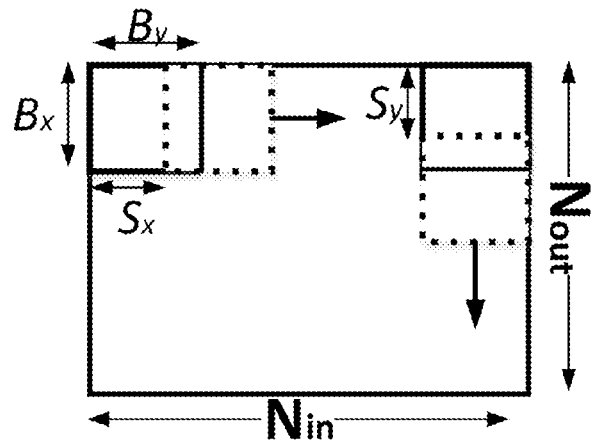
FIG. 2 is a schematic diagram of the function of a filtering unit of an operation device according to another embodiment of the disclosure.
Figure 3:
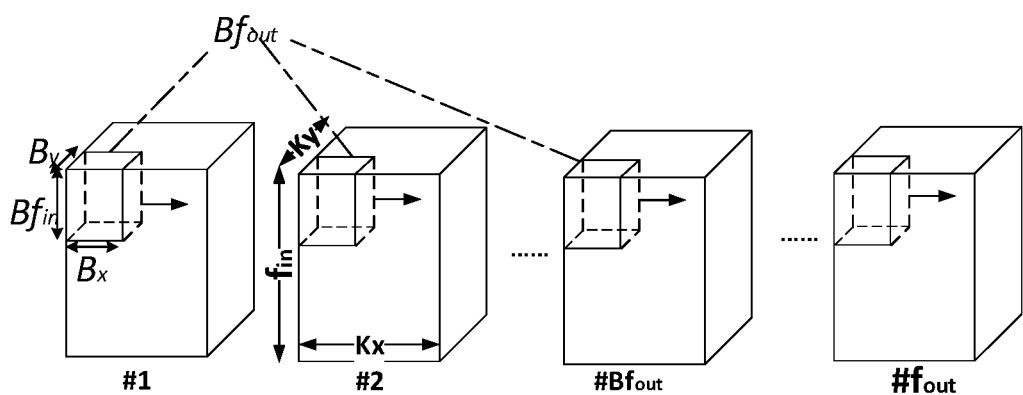
FIG. 3 is a schematic diagram of the function of a filtering unit of an operation device according to another embodiment of the disclosure.
Figure 4:
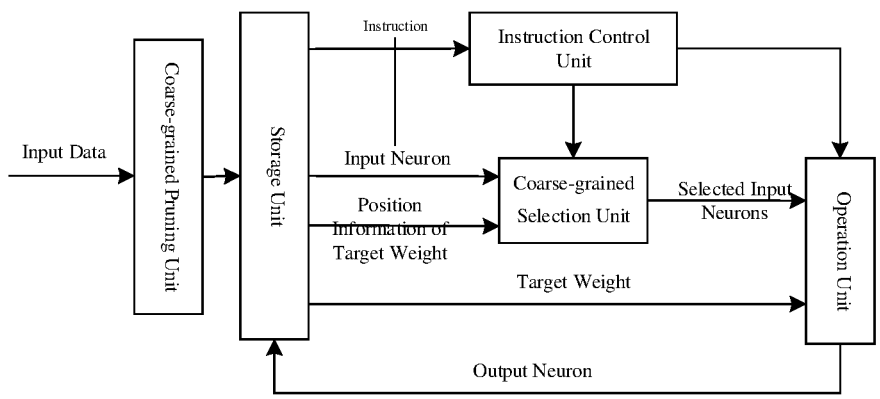
FIG. 4 is a schematic diagram of the function of a filtering unit of an operation device according to another embodiment of the disclosure.
Figure 5:
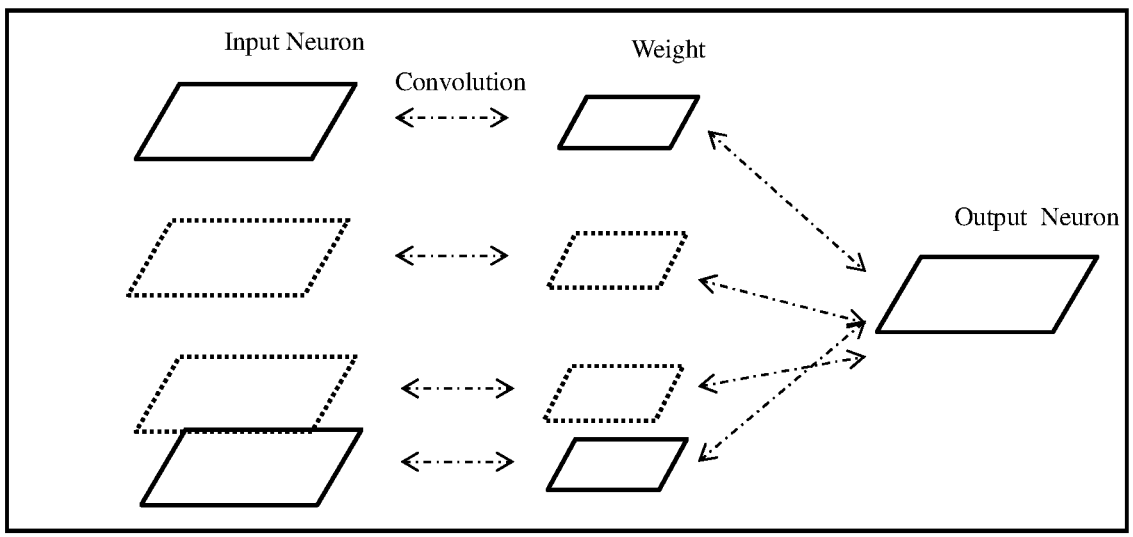
FIG. 5 is a comparative diagram of operations of a convolutional layer in an artificial neural network before structural clipping according to an embodiment of the present disclosure.
Figure 6:
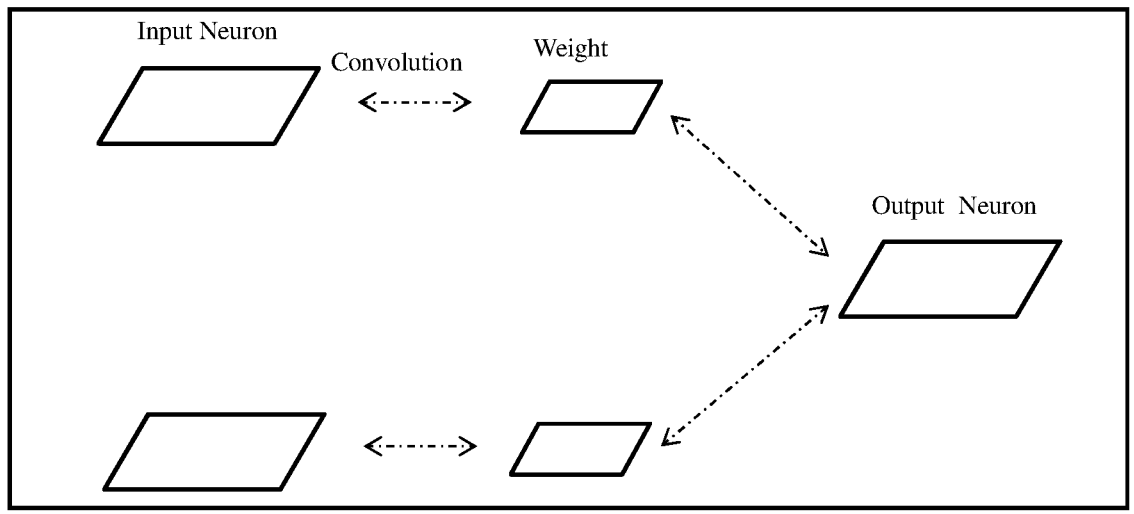
FIG. 6 is a comparative diagram of operations of a convolutional layer in an artificial neural network after structural clipping according to an embodiment of the present disclosure.
Figure 7:
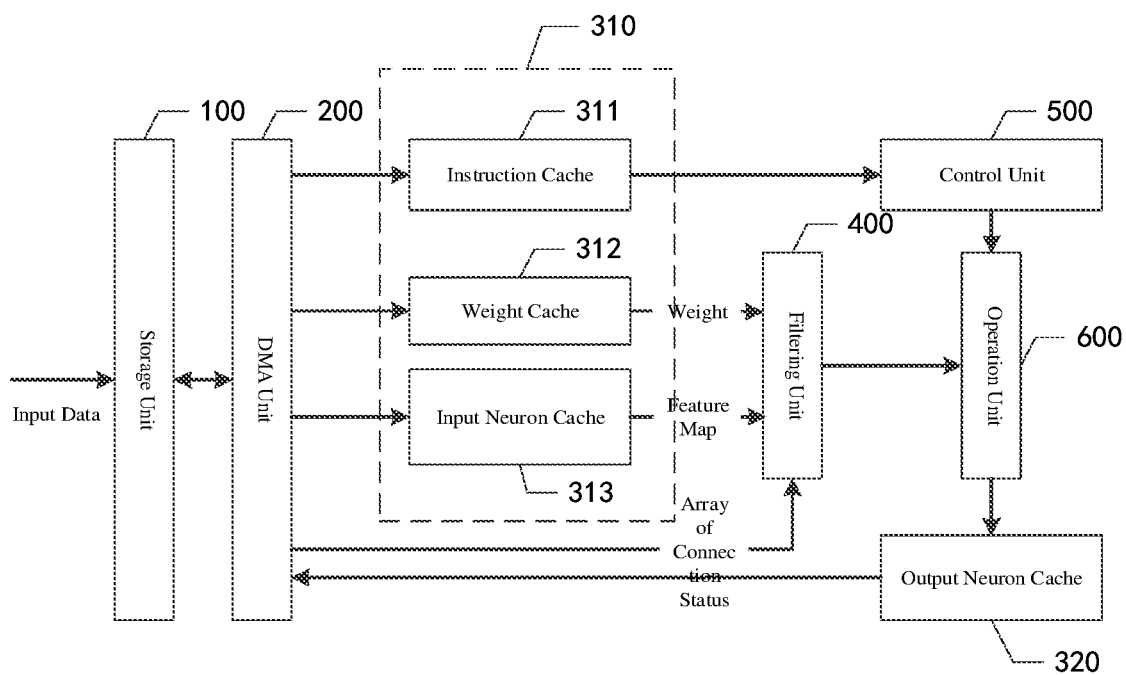
FIG. 7 is a schematic structure diagram of an operation device according to an embodiment of the disclosure.

The present disclosure provides an operation device. FIG. 1 is a schematic diagram of the function of a filtering unit of an operation device according to an embodiment of the disclosure. FIG. 2 is a schematic diagram of the function of a filtering unit of an operation device according to another embodiment of the disclosure. FIG. 3 is a schematic diagram of the function of a filtering unit of an operation device according to another embodiment of the disclosure. FIG. 4 is a schematic diagram of the function of a filtering unit of an operation device according to another embodiment of the disclosure. FIG. 5 is a comparative diagram of operations of a convolutional layer in an artificial neural network before structural clipping according to an embodiment of the present disclosure. FIG. 6 is a comparative diagram of operations of a convolutional layer in an artificial neural network after structural clipping according to an embodiment of the present disclosure. FIG. 7 is a schematic structure diagram of an operation device according to an embodiment of the disclosure.

As shown in FIG. 1, FIG. 2, FIG. 3, FIG. 4, FIG. 5, FIG. 6, and FIG. 7, the operation device may include:

a storage unit 100 configured to store data and instruction;

a caching unit 300 including an input caching unit 310 and an output neuron caching unit 320, where the input caching unit 310 may include an instruction caching unit 311, a weight caching unit 312, and an input neuron caching unit 313;

a filtering unit 400 configured to select a feature map (i.e., input map) and a weight (i.e., kernel) corresponding to the feature map according to a connection array (i.e., index) of the feature map composed of an output neuron and an input neuron, and output the feature map and the weight corresponding to the feature map to an operation unit;

a control unit 500 configured to read a dedicated instruction from the instruction caching unit 311, and decode the dedicated instruction to an operation instruction and input it to an operation unit;

an operation unit 600 configured to perform a corresponding operation on input data according to an instruction stored in the storage unit 100; and a DMA (direct memory access) unit 200 configured to read/write data or instruction in the storage unit 100, the instruction caching unit 311, the weight caching unit 312, the input neuron caching unit 313, and the output neuron caching unit 320, and transmit the connection array to the filtering unit 400.

The connection array of the feature map composed of the output neuron and the input neuron is transmitted from the storage unit 100 to the filtering unit 400 by the DMA unit 200; the input neuron is sequentially transmitted from the storage unit 100 to the filtering unit 400 via the DMA unit 200 and the input neuron caching unit 313; the weight is sequentially transmitted from the storage unit 100 to the filtering unit 400 via the DMA unit 200 and the weight caching unit 312.

The each part of the operation device will be described in detail below.

The storage unit 100 may be configured to store data including a feature map composed of input neurons, the weight, the connection array, the output neuron, and the like.

The instruction caching unit 311 may be configured to store the dedicated instruction.

The weight caching unit 312 may be configured to cache the weight.

The input neuron caching unit 313 may be configured to cache the input neuron.

The output neuron caching unit 320 may be configured to cache the output neuron.

As shown in FIG. 1, FIG. 2, FIG. 3, and FIG. 4, the functions of the filtering unit 400 and the operation unit 600 are as follows:

as shown in FIG. 1, for the case where the weight has not been selected offline, the filtering unit 400 may select out the feature map participating in the subsequent operations and corresponding weights of the operations according to the connection array of the feature map composed of the output neuron and the input neuron, and transmit the input neuron of the feature map and the corresponding weight of the feature map to the operation unit 600 one time or in batch according to the scale; or as shown in FIG. 3, for the case where the weight has not been selected offline, the filtering unit 400 may select out the row/column of the feature map participating in the subsequent operations and the corresponding row/column of the weight according to the connection array of the row/column of the feature map composed of the output neuron and the input neuron, and transmit the input neuron of the feature map and the corresponding weight of the feature map to the operation unit 600 one time or in batch according to the scale; or as shown in FIG. 2, for the case where the weight has been selected offline, the filtering unit 400 may select out the feature map participating in the subsequent operations according to the connection array of the feature map composed of the output neuron and the input neuron, and transmit the input neuron of the feature map to the operation unit 600 one time or in batch according to the scale, at the same time, transmit the weight after offline selecting to the operation unit directly 600; or as shown in FIG. 4, for the case where the weight has been selected offline, the filtering unit 400 may select out the row/column of the feature map participating in the subsequent operations according to the connection array of the row/column of the feature map composed of the output neuron and the input neuron, and transmit the input neuron of the feature map to the operation unit 600 one time or in batch according to the scale, at the same time, transmit the row/column of the weight after offline selecting to the operation unit 600 directly.

Taking a convolutional layer as an example, the comparative diagrams of operations of a convolutional layer in an artificial neural network before and after structural clipping are shown in FIG. 5 and FIG. 6. Before structural clipping, all the feature maps and weights participate the operation. While after the filtering unit performs selecting operation, only input neurons that are connected to the output neurons are selected out as valid feature maps for subsequent operations, which reduces the amount of computation and memory access, achieves structural clipping, improves computational efficiency, and reduces memory access bandwidth.

Figure 8:
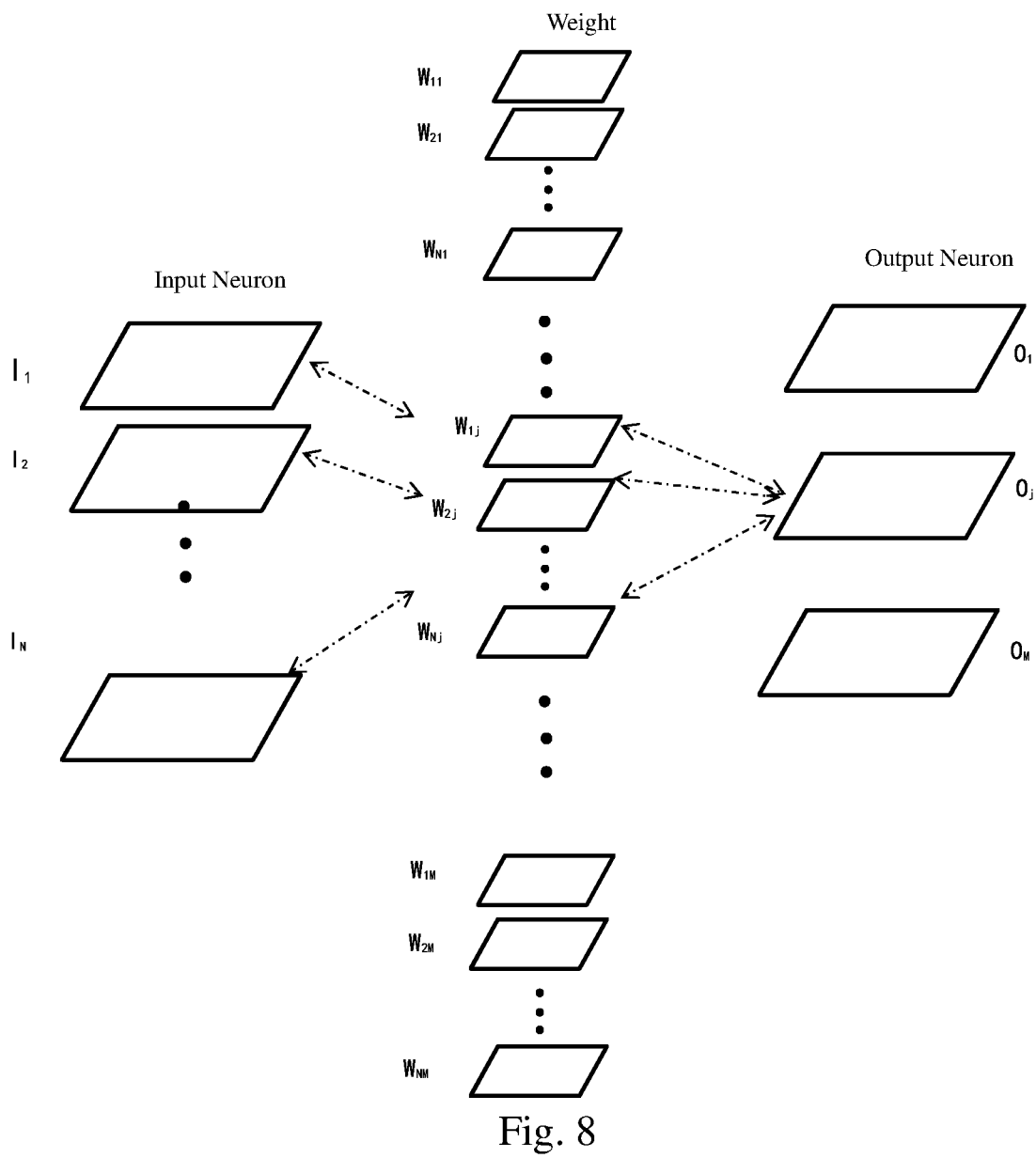
FIG. 8 is a schematic structure diagram of a convolutional layer in a neural network according to an embodiment of the disclosure.
Figure 9:
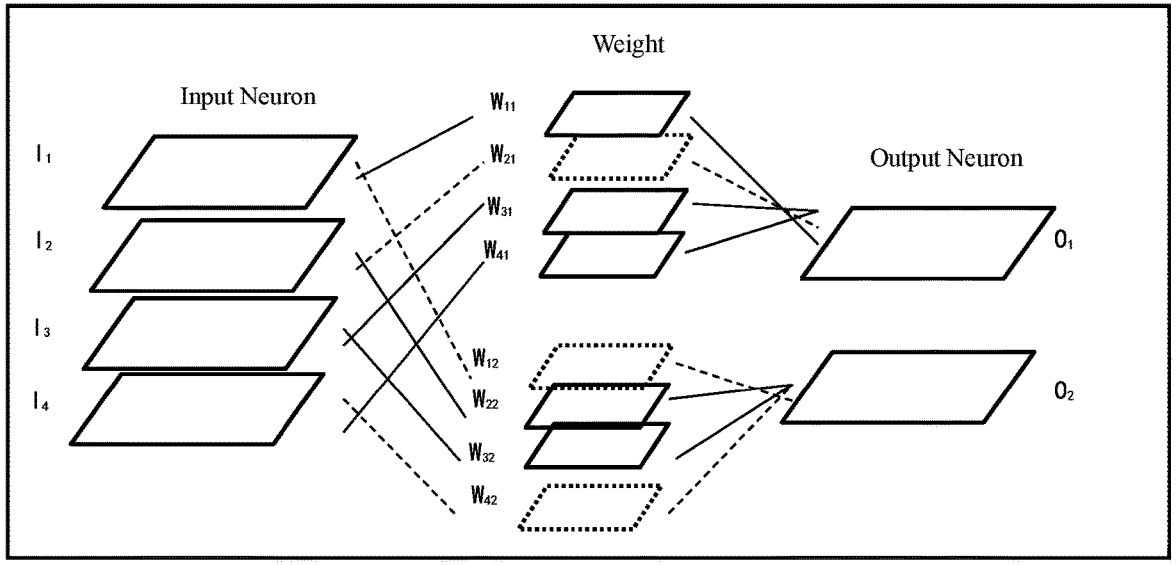
FIG. 9 is a schematic structure diagram of a structural clipping on an artificial neural network by using a filtering unit according to an embodiment of the present disclosure.
Figure 10:
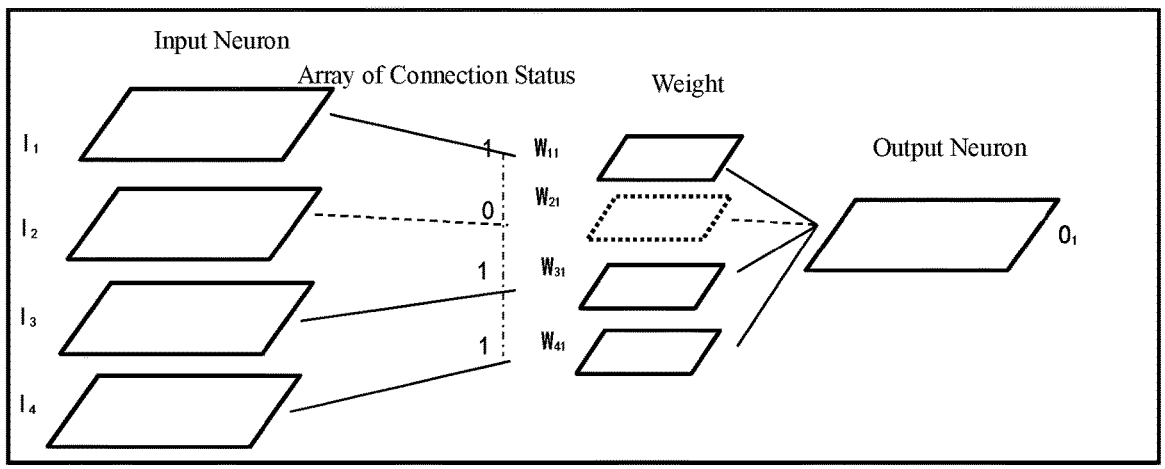
FIG. 10 is a schematic diagram showing an implementation of the structural clipping shown in FIG. 9 by using a connection array according to an embodiment of the present disclosure.
Figure 11:
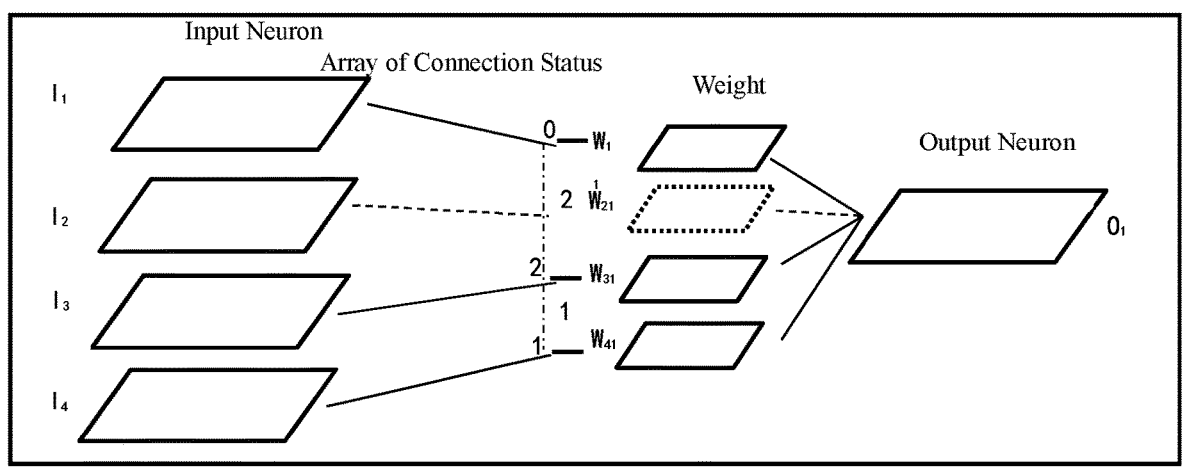
FIG. 11 is a schematic diagram showing another implementation of the structural clipping shown in FIG. 9 by using a connection array according to an embodiment of the present disclosure.

The following is a detailed description of how implements clipping on the structure of the artificial neural network and the representation of the connection array. FIG. 8 is a schematic structure diagram of a convolutional layer in a neural network according to an embodiment of the disclosure. FIG. 9 is a schematic structure diagram of a structural clipping on an artificial neural network by using a filtering unit according to an embodiment of the present disclosure. FIG. 10 is a schematic diagram showing an implementation of the structural clipping shown in FIG. 9 by using a connection array according to an embodiment of the present disclosure. FIG. 11 is a schematic diagram showing another implementation of the structural clipping shown in FIG. 9 by using a connection array according to an embodiment of the present disclosure.

As shown in FIG. 8, the artificial neural network is mainly based on a convolutional operation. Taking the convolutional layer as an example, assuming that the input layer is composed of N input neurons $I_1, I_2, \ldots, I_N$, and the output layer is composed of M output neurons $O_1, O_2, \ldots, O_M$, in that way, there are NM weights $W_{ij}$, i=1, 2, . . . , N, j=1, 2, . . . , M. Before selecting, the output neuron $O_j$ is generated by the feature map composed of all N input neurons and weights $W_{1j}, W_{2j}, \ldots, W_{Nj}$, and the generation process is that $W_{ij}$ may slide on $I_i$ and perform inner product operation to get N feature maps of intermediate results, i=1, 2, . . . , N, where each feature map of intermediate results has the same size as $O_j$, then the N feature maps of intermediate results are added in element-wise manner and accumulated into a feature map composed of output neurons, i.e., $O_j$, where the output neurons $O_j$ may share a connection array, or each output neuron may correspond to a connection array, and all of NM $W_{ij}$ are weights before selecting.

The weight may be selected by the filtering unit, or may be selected offline beforehand.

The connection array of the feature map composed of the output neuron and the input neuron may have a plurality of representations. Optionally, the first representation is: for the Index A corresponding to each output neuron, A has N bits because that the input layer has N nodes, and the value of each bit is 1 or 0, for example, if the value $A_i$ of $i^{th}$ bit is 1, then $I_i$ is connected to the output neuron by the weight, and if the value $A_i$ of bit is 0, then $I_i$ is not connected to the output neuron by the weight; in the filtering unit, the Index is known, and each selected $I_k$ and $W_{kj}$ for computing the output neuron satisfy: $A_k=1$, $k \in \{1, 2, \ldots, N\}$, and the output neuron is in the $O_j$; moreover, 0 may indicate that the output neuron is connected to the input neuron by the weight, and 1 may indicate that the output neuron is not connected to the input neuron by the weight, the analysis is the same as above.

The second representation of the connection array is: for the Index A corresponding to each output neuron, the value of each bit is a non-negative integer, and the feature map composed of the input neuron connected to the output neuron is $I_{k_1}$, $I_{k_2}$, ..., $I_{k_n}$, $n \leq N$, $k_1$, $k_2$, ..., $k_n \in \{1, 2, \ldots, N\}$, and the values are unknown. Index A has n bits, the value of the $1^{th}$ bit is $A_1$, which indicates the distance from the input neuron where the first connection is located to $I_1$, the value of $p^{th}$ bit is $A_P$, $p=2, 3, \ldots, n$, which indicates the distance from the input neuron where the current connection is located to the input neuron where the previous connection is located. In the filtering unit, the connection array is known, and the selected feature map composed of input neurons for computing the output neuron is $I_{k_1}$, $I_{k_2}$, ..., $I_{k_n}$, and the corresponding weights are $W_{k_1j}$, $W_{k_2j}$, ..., $W_{k_nj}$, where $k_1=A_1+1$, $k_p=A_p+k_{p-1}$, and the output neuron is in $O_j$.

It can be understood that in addition to the first and second representations, those skilled in the art can also select other representations to represent the connection array according to requirements.

In order to make it easier to understand the functions of the filtering unit provided by the present disclosure, a specific artificial neural network is taken as an example to introduce the datan operation process of the filtering unit. As shown in FIG. 9, taking N=4, M=2 as an example, the input layer is composed of 4 input neurons $I_1$, $I_2$, $I_3$, $I_4$, and the output layer is composed of 2 output neurons $O_1$, $O_2$.

The convolutional layer has 4 input neurons $I_1$, $I_2$, $I_3$, $I_4$ and 2 output neurons $O_1$, $O_2$; and the weights before selecting used for generating $O_1$, $O_2$ are $W_{11}$, $W_{21}$, $W_{31}$, $W_{41}$ and $W_{12}$, $W_{22}$, $W_{32}$, $W_{42}$. It is assumed that all the output neurons in the feature map composed of output neurons share an connection array, the corresponding connection array of $O_1$, $O_2$ is $A^{(1)}$, $A^{(2)}$. The dotted square in FIG. 9 indicates the weights that are removed after structural clipping, that is, the selected weight s are $W_{11}$, $W_{31}$, $W_{41}$ and $W_{22}$, $W_{32}$, and the result is shown in FIG. 9.

If the connection array uses the first representation, 1 indicates that the output neuron is connected to the input neuron by the weight, 0 indicates that the output neuron is not connected to the input neuron by the weight.

As shown in FIG. 10, the corresponding Index $A^{(1)}$ of the output neuron in $O_1$ is 1011. Because $A_1^{(1)}=A_3^{(1)}=A_4^{(1)}=1$; the selected feature maps composed of input neurons used to compute $O_1$ are $I_1$, $I_3$, $I_4$, and the corresponding weights are $W_{11}$, $W_{31}$, $W_{41}$.

If the connection array uses the second representation: as shown in FIG. 11, the corresponding Index $A^{(1)}$ of the output neuron in $O_1$ is 021. Therefore, for $O_1$, $k_1=0+1=1$, $k_2=2+1=3$, $k_3=1+3=4$; for $O_2$, $k_1=1+1=2$, $k_2=1+3=3$. The selected feature maps composed of input neurons used to compute $O_1$ are $I_1$, $I_3$, $I_4$, and the corresponding weights are $W_{11}$, $W_{31}$, $W_{41}$.

The two representations of Index can realize the selecting of the feature maps composed of input neurons and weights.

The operation unit 600 may include but not be limited to: a first part, multiplier; a second part, an adder tree; and a third part, an active function unit.

The first part may multiply input data 1 and input data 2 to obtain output data, the process is: out=in1*in2. The input data 1 is recorded as in1, the input data 2 is recorded as in2, and the output data is recorded as out.

The second part may add the input data in1 through an adder tree step by step to obtain the output data (out), where in1 is a vector of length N, and N is greater than 1, the process is: out'=in1[1]+in1[2]+ . . . +in1[N]; and/or add the input data 1 in1 step by step through the adder tree to obtain a sum, and then add the sum and the input data 2 in2 to obtain the output data (out"), the process is: out"=in1[1]+in1[2]+ . . . +in1[N]+in2; or add the input data (in1) and the input data (in2) to obtain the output data (out'''), the process is: out'''=in1+in2. The out', out", and out''' represent three output results.

The third part may perform an active operation on the input data in to obtain the output data(out), the process is out=active(in), where the active operation may include sigmoid, tanh, relu, softmax, and the like; in addition to the active operation, the third part may implement other non-linear functions, that is, the third part may perform an operation (f) on the input data (in) to obtain the output data (out), the process is: out=f(in).

The fourth part may perform a pooling operation on the input data (in) to obtain the output data (out), the process is out=pool(in), where pool represents the pooling operation, and the pooling operation is implemented by a pooling unit, which is in parallel with the active function unit in the third part. The pooling operation may include but not be limited to: mean pooling, maximum pooling, or median pooling. The input data is the data in a pooling core associated with the output data.

The operations performed by the operation unit may include a neural network operation, and the network operation may include: the first part multiplies input data 1 and input data 2 to obtain a product; the second part performs an adder tree operation, that is, the second part adds the input data 1 through an adder tree step by step, or adds the input data 1 to the input data 2 to obtain output data; the third part performs an active function, that is, the third part performs the active function on the input data to obtain the output data; the fourth part performs pooling operation, and the process is out=pool(in), where pool represents the pooling operation. The pooling operation may include but not be limited to: mean pooling, maximum pooling, or median pooling. The input data in is the data in a pooling core associated with the output data(out). One or more operations parts may be freely selected in different orders to achieve the operations with various functions.

Figure 12:
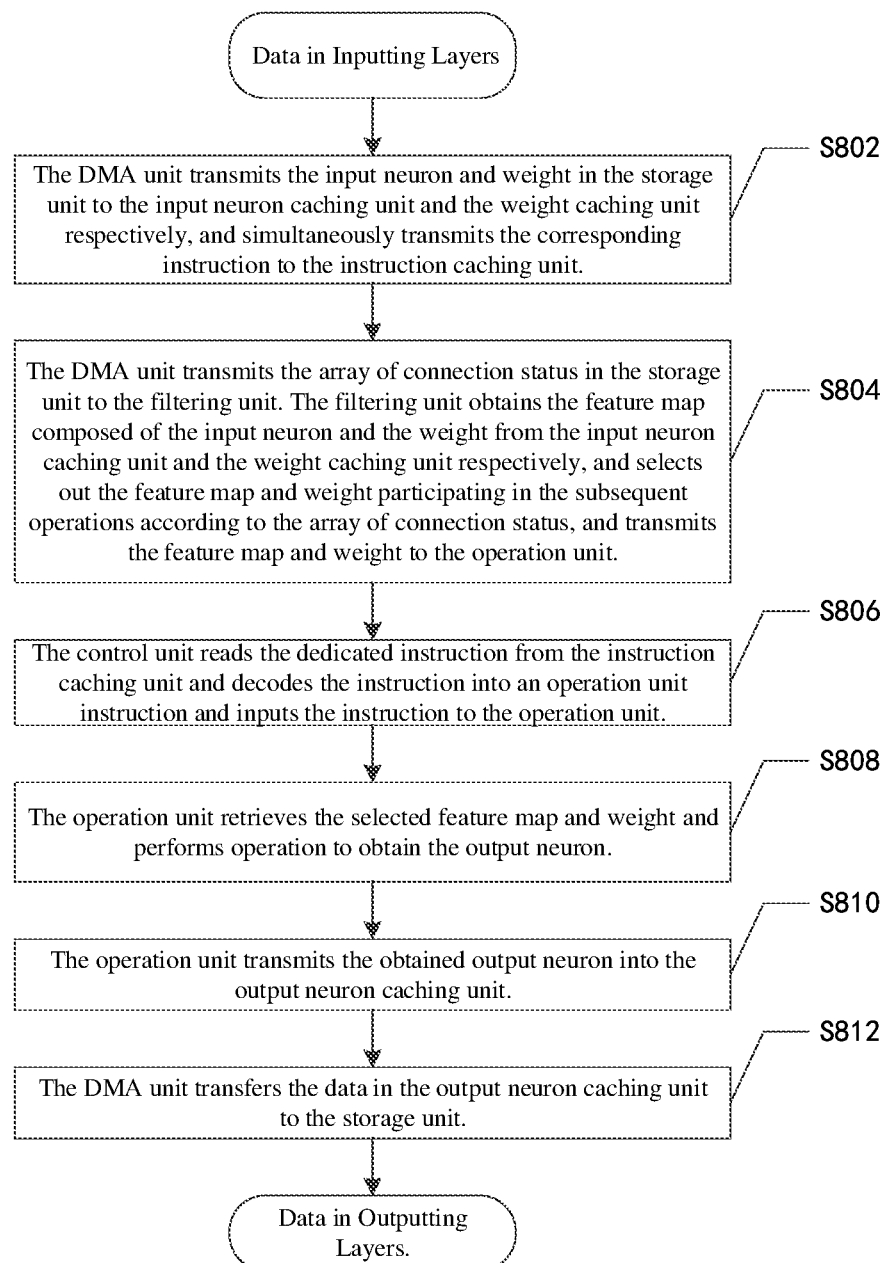
FIG. 12 is a flowchart of an operation method performed by an operation device according to an embodiment of the disclosure.
Figure 13:
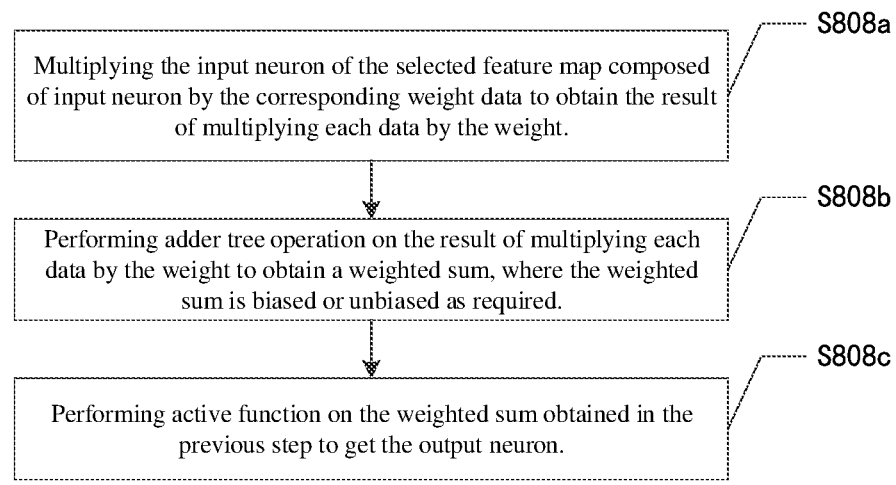
FIG. 13 is a flowchart of sub-steps corresponding to step S808 shown in FIG. 38A according to an embodiment of the disclosure.

FIG. 12 is a flowchart of an operation method performed by an operation device as shown in FIG. 7 according to an embodiment of the disclosure. FIG. 13 is a flowchart of sub-steps corresponding to step S808 shown in FIG. 38A according to an embodiment of the disclosure. As shown in FIG. 7, FIG. 12, and FIG. 13, the operation method performed by the operation device may include the following steps.

In step S802, transmitting, by the DMA unit 200, the input neurons and weights in the storage unit 100 to the input neuron caching unit 313 and the weight caching unit 312 respectively, and simultaneously transmitting the corresponding instructions into the instruction caching unit 311.

In step S804, transmitting, by the DMA unit 200, the connection array in the storage unit 100 to the filtering unit 400; obtaining, by the filtering unit 400, the feature map composed of the input neurons and the weight from the input neuron caching unit 313 and the weight caching unit 312 respectively, and selecting out the feature maps and the corresponding weights participating in the follow-up operations corresponding the connection array, and transmitting the feature maps and the weights to the operation unit 600.

In step S806, reading, by the control unit 500, the dedicated instruction from the instruction caching unit 311, and decoding the instruction into the operation unit and transmitting it into the operation unit 600.

In step S808, retrieving, by the operation unit 600, the selected feature maps and weights, and performing operation to obtain the output neuron.

Based on the above steps, the operation process of the operation unit 600 is divided into the following sub-steps:

in sub-step S808a, multiplying the input neurons of the selected feature map composed of input neurons by the corresponding weights to obtain the result of multiplying each data by the weight;

in sub-step S808b, performing an adder tree operation on the result of multiplying each data by the weight to obtain a weighted sum, where the weighted sum is biased or unbiased as required;

in sub-step S808c, performing an active function on the weighted sum obtained in the previous stride to get the output neuron.

In step S810, transmitting, by the operation unit 600, the obtained output neuron to the output neuron caching unit 320.

In step S812, transferring, by the DMA unit 200, the data in the output neuron caching unit 320 into the storage unit 100.

The above steps may be repeated until the output of the final layer of the network is obtained.

It should be noted that the input neurons mentioned in the present disclosure do not refer to the neurons in the input layer of the entire neural network, but for any two adjacent layers in the network, the neurons in the lower layer of the front end of feed-forward operation of the network are input neurons; and output neurons mentioned in the present disclosure do not refer to the neurons in the output layer of the entire neural network, but for any two adjacent layers in the network, the neurons in the upper layer of the back end of feed-forward operation of the network are output neurons. Specifically, let a convolutional neural network has L layers, K=1, 2, . . . , L−1, for the layer K and layer K+1, the layer K may be defined as the input layer, where the neurons in the layer K are the input neurons, and define the layer K+1 as the output layer, where the neurons in the layer K+1 are the output neurons. That is, except for the last layer, each layer can be defined as an input layer, the next layer is the corresponding output layer, and the count of neurons in each layer is predictable.

Figure 14:
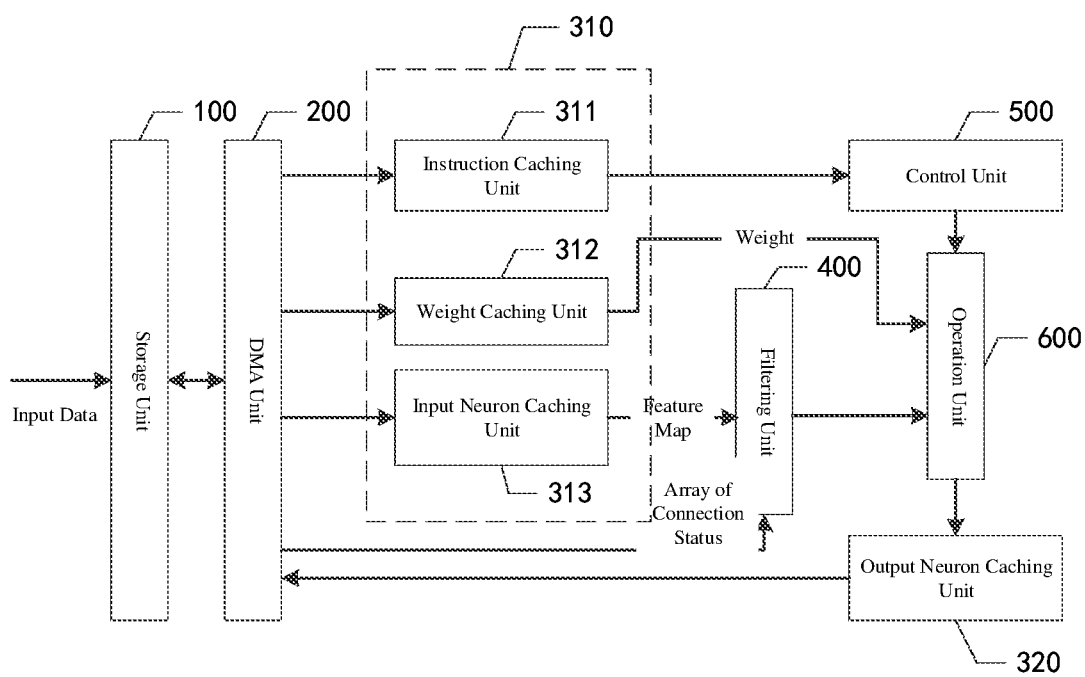
FIG. 14 is a schematic structure diagram of another operation device according to an embodiment of the disclosure.

As mentioned above, the weight may be selected by the filtering unit, or may be selected offline beforehand. In the first embodiment of the present disclosure, the weight may be selected by the filtering unit. In the second embodiment of the present disclosure, another operation device is provided, which is suitable for offline selecting the weights without passing through the filtering unit. FIG. 14 is a schematic structure diagram of another operation device according to an embodiment of the disclosure. As shown in FIG. 14, each module/unit included in the operation device provided in this embodiment is the same. The difference from the first embodiment is that the function of the filtering unit 400 is different. In this embodiment, the weight is not selected by the filtering unit 400, but directly transmitted from the weight caching unit 312 to the operation unit 600.

The operation method performed by the operation device shown in this embodiment, please refer to FIG. 12 and FIG. 13. The operation method is substantially the same as an operation method in the first embodiment, but only the step S804 is replaced with the following step:

in step 804', transmitting, by the DMA unit 200, the connection array in the storage unit 100 to the filtering unit 400; obtaining, by the filtering unit, the feature map composed of the input neurons form the input neuron caching unit 313, selecting out the feature map participating the follow-up operations according to the connection array, and transmitting the feature map to the operation unit 600; transmitting the selected weight from the weight caching unit 312 to the operation unit 600 simultaneously.

The operation devices shown in the above two embodiments are respectively read the feature map composed of the weight and the input neuron from the weight caching unit 312 and the input neuron caching unit 313 and transmit the feature map to the filtering unit 400. In actual operation, the operation devices may directly read the feature map composed of the weight and the input neuron from the DMA unit 200 and transmit the feature map to the filtering unit 400.

Figure 15:
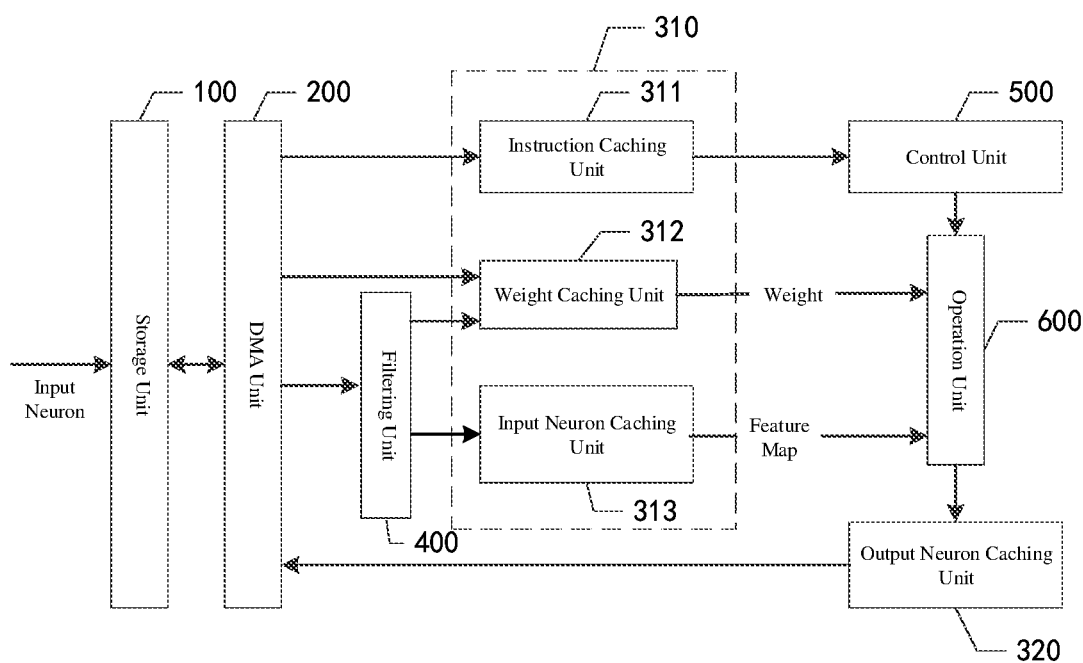
FIG. 15 is a schematic structure diagram of another operation device according to an embodiment of the disclosure.

FIG. 15 is a schematic structure diagram of another operation device according to the third embodiment of the disclosure. As shown in FIG. 15, the operation device provided in this embodiment is the same as the module/unit of the first embodiment, and the difference from the first embodiment lies in the following points.

1. The difference in position setting compared to the first embodiment is that the filtering unit 400 is set directly connected to the DMA unit 200, and directly transfers the weight and the feature map composed of the input neurons from the DMA unit 200 to the filtering unit 400. Then, the selected weight and the feature map composed of the input neurons by the filtering unit 400 are respectively transmitted to the weight caching unit 312 and the input neuron caching unit 313, and finally transmitted to the operation unit 600.

2. The difference in function setting is that one data processing path for offline selecting weight is set up in the present embodiment more than the first embodiment. Specifically, in addition to the selection that the weight may be selected by the filtering unit 400 and transmitted to the weight caching unit 312, and finally transmitted to the operation unit 600, the weight may be also transmitted to the operation unit 600 directly via the weight caching unit 312, where the latter selection applies to the situation where the weight has been selected offline.

Based on the above settings, the operation device provided by the third embodiment can simultaneously implement data processing where the weight is selected offline and the weight is not selected offline. Referring to FIG. 12, FIG. 13, and an operation method performed by an operation device in the first embodiment, the operation method performed by the operation device of the present embodiment, only needs to replace the steps S802 and S804 in the operation method described in the first embodiment with the following steps:

in step S802", transmitting, by the DMA unit 200, the instruction in the storage unit 100 into the instruction caching unit 311;

in step S804"a, transmitting, by the DMA unit 200, the connection array, the feature map composed of the input neurons, and the weight into the filtering unit 400; selecting out, by the filtering unit, the feature map and the corresponding weight of the feature map participating the follow-up operations according to the connection array, and transmitting the input neuron in the selected feature map composed of the input neuron, and the corresponding weight to the input neuron caching unit 313 and the weight caching unit 312 respectively;

in step S804"b, transmitting, by the DMA unit 200, the connection array and the feature map composed of the input neurons in the storage unit 100 to the filtering unit 400; selecting out, by the filtering unit 400, the feature map for performing computation to obtain the output neuron, and transmitting the input neuron into the input neuron caching unit 313; transmitting, by the DMA unit 200, the selected weight from the weight caching unit 312 to the operation unit 600 simultaneously.

The execution process of the above steps is as follows: if the weight is not selected offline, the step S804"a may be performed after the step S802" is completed; if the weight has been selected offline, the step S804"b may be performed after the step S802" is completed.

In an embodiment, the operation device may further include a connection relationship generating unit configured to generate the connection relationship according to the input neuron, the weight, and the output neuron.

In an embodiment, the connection relationship generating unit is independent of the operation device. The connection relationship generating unit may be included in a main processor, and the operation device may be included in a co-processor; or the connection relationship generating unit may be included in a slave processor, and the operation device may be included in a main co-processor.

In a fourth exemplary embodiment of the present disclosure, an electronic device is provided. The electronic device includes a board card. The board card includes a chip package structure. The chip package structure includes a chip. The chip includes an operation device provided by the embodiment of the present disclosure.

The electronic device may include a robot, a computer, a printer, a scanner, a tablet computer, an intelligent terminal, a mobile phone, an automobile data recorder, a navigator, a sensor, a webcam, a cloud server, a camera, a video camera, a projector, a watch, an earphone, a mobile storage, a wearable device, a vehicle, a household electrical appliance, and/or a medical device.

The vehicles may include an airplane, a ship, and/or a car. The household electrical appliance may include a television, an air conditioner, a microwave oven, a refrigerator, an electric rice cooker, a humidifier, a washing machine, an electric lamp, a gas cooker, and a range hood. The medical device may include a nuclear magnetic resonance spectrometer, a B-ultrasonic scanner, and/or an electrocardiograph.

In summary, the embodiment of the present disclosure provides an operation device and an operation method. The structural clipping is implemented by setting the filtering unit between the input neuron and the output neuron, and using the connection array of the feature map composed of the output neuron and the input neuron. And the feature maps and corresponding weights of the artificial neural network participating in the subsequent operations are selected out, which avoids the computational redundancy and memory access caused by all input neurons and weights participating in the network operation. Redundant, and also applicable to the case where the weight is offline filtered and not filtered offline, which solves the problems that the CPU and GPU performance is insufficient, the front-end decoding overhead is large, and the input neurons and weight data are fully exploited. Reusability reduces the memory access bandwidth, reduces the amount of computation and memory, and achieves high efficiency output.

The present disclosure provides an operation device and an operation method. A filtering unit is set between the input neuron and the output neuron, and the structural clipping is implemented by using a connection array of the feature map composed of the output neuron and the input neuron. The feature map and the corresponding weight of the feature map of the artificial neural network participating in the subsequent operations are selected out after structural clipping, which avoids computation redundancy and memory access redundancy caused by all input neurons and weights participating in the network operation, and is applicable to the case where the weight is selected offline and not selected offline. Moreover, the present disclosure solves the problem that the CPU and GPU have inadequate operational performance and the front-end decoding overhead is high, and fully exploits the reusability of input neurons and weights, reduces the memory access bandwidth and the amount of computation and memory, and achieves efficient output.

It should be noted that all of the modules in the embodiment of the disclosure may be hardware structures. Physical implementation of the hardware structures may include but not be limited to physical device, and the physical device may include but not be limited to transistors, memristors, and Deoxyribonucleic Acid (DNA) computers. It should be noted that in the drawings of the present disclosure, the same elements are represented by the same or similar drawing marks. A conventional structure or construction is omitted where it may cause confusion in the understanding of the invention. It should be noted that the shape and size of each part in the draws do not reflect the true size and proportion, but only indicate the contents of the embodiment of the invention.

Those skilled in the art should understand that the modules in the devices of the embodiment may be adaptively changed and placed in one or more different devices of the embodiment. The modules or units or components of the embodiment may be combined into one module or unit or component, and may be divided into a plurality of sub-modules or sub-units or sub-components. In addition to the above characteristics and/or process or that at least some of units are mutually exclusive, all of the characteristics, processes or units of any method or device disclosed in this specification (including accompanying claims, abstracts and drawings) may be combined in any manner. Unless there are clear statements, each feature disclosed in this specification (including accompanying claims, abstracts and drawings) can be replaced by an alternative feature of the same, equivalent or similar purpose.

The purposes, technical solutions, and beneficial effects of the present disclosure are further described above with the specific embodiments in detail. It is to be understood that the above is only the specific embodiment of the disclosure and not intended to limit the disclosure. Any modifications, equivalent replacements, improvements, and the like made within the spirit and principle of the disclosure shall fall within the scope of protection of the disclosure.

What is claimed is:

1. An operation device, comprising:
  a filtering circuit configured to select a feature map and a weight corresponding to the feature map participating in subsequent operations according to a connection array of the feature map composed of the output neuron and an input neuron, and output the feature map and the weight corresponding to the feature map to an operation circuit; and/or configured to select a row of the feature map and a row of weight corresponding to the row of the feature map according to a connection array of each row in the feature map composed of an output neuron and an input neuron, and output the row of the feature map and the row of weight corresponding to the row of the feature map to the operation circuit; and/or configured to select a column of the feature map and a weight column corresponding to the column of the feature map according to a connection array of each column in the feature map composed of an output neuron and an input neuron, and output the column of the feature map and the weight column of the column of the feature map to an operation circuit; and the operation circuit configured to perform a corresponding artificial neural network operation supporting structure clipping on data output by the filtering circuit according to an instruction to obtain an output neuron, wherein a selecting process of the filtering circuit includes:

if the weight has not been selected offline, selecting out the feature map and a corresponding weight of the feature map according to the connection array of the feature map composed of the output neuron and the input neuron, and outputting the selected feature map and a corresponding weight of the feature map to the operation circuit and/or selecting out a row/column of the feature map and a corresponding row/column of the weight according to a connection array of row/column of the feature map composed of the output neuron and the input neuron, and outputting the selected row/column of the feature map and the corresponding row/column of the weight to the operation circuit; and if the weight has been selected offline, selecting out the feature map according to the connection array of the feature map composed of the output neuron and the input neuron, outputting the selected feature map to the operation circuit, and directly outputting the weight after selecting offline to the operation circuit without passing by the filtering circuit at the same time; and/or selecting the row/column of the feature map and the corresponding row/column of the weight according to the connection array of row/column of the feature map composed of the output neuron and the input neuron, and outputting the selected row/column of the feature map and the corresponding row/column of the weight to the operation circuit.

2. The operation device of claim 1, wherein the connection array is configured to represent a connection status between the output neuron and the input neuron, and representations of the connection array include:

a first representation: taking numbers "0" and "1" to represent the connection status, where "1" means that the output neuron is connected to the input neuron, and "0" means that the output neuron is not connected to the input neuron, or "0" means that the output neuron is connected to the input neuron, and "1" means that the output neuron is not connected to the input neuron; the connection array of the feature map composed of the output neuron and the input neuron is a connection array composed of "0" and "1" of the feature map composed of each output neuron and all input neurons, the connection array of row/column of the feature map composed of the output neuron and the input neuron is a connection array composed of "0" and "1" of the row/column of the feature map composed of each output neuron and all input neurons; and a second representation: taking a distance to represent the connection status, where the connection array of the feature map composed of the output neuron and the input neuron is an array combining of a distance from the input neuron where a first connection is located to a first input neuron, a distance from the input neuron where a second connection is located to a previous connection in the input neuron, a distance from the input neuron where a third connection is located to a previous connection in the input neuron, . . . , and so on, until all the input neurons connected to the output neuron are exhausted, and the connection array is used to represent the corresponding connection status of the output neuron.

3. The operation device of claim 2, wherein elements in the array of the second representation method are non-negative integers.

4. The operation device of claim 2, wherein the feature map and the corresponding weight of the feature map selected for computation by using the connection array of the feature map composed of the output neuron and the input neuron or the connection array of the row/column of the feature map composed of the output neuron and the input neuron, or the row/column of the feature map and the corresponding row/column of the weights meet the following conditions:

a first representation: elements in the connection array corresponding to the feature map and the corresponding weight of the feature map selected for computing the output neuron are numbers that indicate having a connection relation, and/or the elements in the connection array corresponding to the row/column of the feature map and the corresponding row/column of the weight selected for computing the output neuron are numbers indicating having a connection relation; or a second representation: for a connection array Index A corresponding to each output neuron $O_j$, a value of each bit is a non-negative integer, and all the input neurons are $I_1, I_2, \ldots, I_N$, let the input neurons connected to the output neuron be 1 $I_{k_1}, I_{k_2}, \ldots, I_{k_n}$, n≤N, $k_1, k_2, \ldots, k_n \in \{1, 2, \ldots, N\}$, and the values are unknown, then Index A has n bits, a value of a first bit is $A_1$, which indicates a distance from the input neuron where the first connection is located to $I_1$; a value of a $p^{th}$ bit is $A_p$, p=2, 3, . . . , n, which indicates a distance from the input neuron where a current connection is located to the input neuron where the previous connection is located, therefore selected input neurons for computing the output neuron $O_j$ are $I_{k_1}, I_{k_2}, \ldots, I_{k_n}$, and corresponding weights are $W_{k_1 j}, W_{k_2 j}, \ldots, W_{k_n j}$, where $k_1 = A_1 + 1$, $k_p = A_p + k_{p-1}$.

5. The operation device of claim 1, further comprising a storage circuit configured to store data and an instruction, wherein the data stored in the storage circuit includes:

the feature map composed of the input neuron, the weight, the connection array of the feature map composed of the output neuron and the input neuron, the connection array of each row in the feature map composed of the output neuron and the input neuron, the connection array of each column in the feature map composed of the output neuron and the input neuron, the feature map composed of the output neuron, and other data and parameters required for the artificial neural network operation.

6. The operation device of claim 1, wherein the operation circuit includes:

a first part: a multiplier configured to multiply first input data and second input data to obtain a product;

a second part: one or a plurality of adders configured to add the product step by step to obtain a sum, where bias processing is or is not performed on the sum as needed; and a third part: an activation function configured to perform an activation operation on the sum to obtain an output neuron.

7. The operation device of claim 1, further comprising a caching circuit configured to cache data and an instruction, wherein the caching circuit includes:
an input caching circuit configured to cache the input data and instructions; and
an output caching circuit configured to cache the output neuron, and wherein the input caching circuit includes:
an instruction caching circuit configured to store a dedicated instruction;
a weight caching circuit configured to cache the weight; and
an input neuron caching circuit configured to cache the input neuron.

8. The operation device of claim 7, further comprising:
a control circuit configured to read the dedicated instruction from the instruction caching circuit, and decode the dedicated instruction to an operation instruction and input the operation instruction to an operation circuit, and
a DMA (direct memory access) circuit configured to read/write data or instruction in a storage circuit, the instruction caching circuit, the weight caching circuit, the input neuron caching circuit, and the output neuron caching circuit, and transmit the connection array to the filtering circuit; wherein
the connection array of the feature map composed of the output neuron and the input neuron is transmitted from the storage circuit to the filtering circuit by the DMA circuit; the input neuron is sequentially transmitted from the storage circuit to the filtering circuit via the DMA circuit and the input neuron caching circuit; and the weight is sequentially transmitted from the storage circuit to the filtering circuit via the DMA circuit and the weight caching circuit.

9. An operation method, comprising:
selecting, by a filtering circuit, a feature map and a corresponding weight of the feature map according to a connection array of the feature map composed of an output neuron and an input neuron,
outputting, by the filtering circuit, the feature map and a corresponding weight of the feature map to an operation circuit;
selecting, by the filtering circuit, a row of the feature map and a corresponding row of weight according to a connection array of each row in the feature map composed of an output neuron and an input neuron,
outputting, by the filtering circuit, the row of the feature map and the corresponding row of weight to the operation circuit;
selecting, by the filtering circuit, a column of the feature map and a corresponding weight column according to a connection array of each column in the feature map composed of an output neuron and an input neuron, and
outputting, by the filtering circuit, the column of the feature map and the corresponding weight column to an operation circuit; and
performing, by the operation circuit, a corresponding artificial neural network operation supporting structure clipping on data output by the filtering circuit according to an instruction to obtain an output neuron.

10. The operation method of claim 9, wherein the selecting by the filtering circuit includes:
when the weight has not been selected offline, selecting out the feature map and a corresponding weight of the feature map according to the connection array of the feature map composed of the output neuron and the input neuron, and
outputting the selected feature map and a corresponding weight of the feature map to the operation circuit;
selecting out a row/column of the feature map and a corresponding row/column of the weight according to a connection array of row/column of the feature map composed of the output neuron and the input neuron, and
outputting the selected row/column of the feature map and the corresponding row/column of the weight to the operation circuit.

11. The operation method of claim 9, wherein the selecting by the filtering circuit includes:
when the weight has been selected offline, selecting out the feature map according to the connection array of the feature map composed of the output neuron and the input neuron,
outputting the selected feature map to the operation circuit, and
directly outputting the weight after selecting offline to the operation circuit without passing by the filtering circuit at the same time;
selecting the row/column of the feature map and the corresponding row/column of the weight according to the connection array of row/column of the feature map composed of the output neuron and the input neuron, and
outputting the selected row/column of the feature map and the corresponding row/column of the weight to the operation circuit.

12. The operation method of claim 9, wherein the connection array is configured to represent a connection status between the output neuron and the input neuron, and representations of the connection array include:
a first representation: taking numbers "0" and "1" to represent the connection status, where "1" means that the output neuron is connected to the input neuron, and "0" means that the output neuron is not connected to the input neuron; or "0" means that the output neuron is connected to the input neuron, and "1" means that the output neuron is not connected to the input neuron; the connection array of the feature map composed of the output neuron and the input neuron is a connection array composed of "0" and "1" of the feature map composed of each output neuron and all input neurons; the connection array of row/column of the feature map composed of the output neuron and the input neuron is a connection array composed of "0" and "1" of the row/column of the feature map composed of each output neuron and all input neurons; and
a second representation: taking a distance to represent the connection status, where the connection array of the feature map composed of the output neuron and the input neuron is an array combining of a distance from the input neuron where a first connection is located to a first input neuron, a distance from the input neuron where a second connection is located to a previous connection in the input neuron, a distance from the input neuron where a third connection is located to the previous connection in the input neuron, . . . , and so on, until all the input neurons connected to the output neuron are exhausted, and the connection array is used to represent the corresponding connection status of the output neuron.

13. The operation method of claim 12, wherein the feature map and the corresponding weight of the feature map selected for computation by using the connection array of the feature map composed of the output neuron and the input neuron or the connection array of the row/column of the feature map composed of the output neuron and the input neuron, or the row/column of the feature map and the corresponding row/column of the weights meet the following conditions:

a first representation: the elements in the connection array corresponding to the feature map and the corresponding weight of the feature map selected for computing the output neuron are numbers indicating having a connection relation, and/or the elements in the connection array corresponding to the row/column of the feature map and the corresponding row/column of the weight selected for computing the output neuron are numbers indicating having a connection relation; or a second representation: for a connection array Index A corresponding to each output neuron $O_j$, a value of each bit is a non-negative integer, and all the input neurons are $I_1, I_2, \ldots, I_N$, let the input neurons connected to the output neuron be 1 $I_{k_1}, I_{k_2}, \ldots, I_{k_n}$, n≤N, $k_1, k_2, \ldots, k_n \in \{1, 2, \ldots, N\}$, and the values are unknown, then Index A has n bits, a value of a first bit is $A_1$, which indicates a distance from the input neuron where the first connection is located to $I_1$; a value of a $p^{th}$ bit is $A_P$, p=2, 3, ..., n, which indicates a distance from the input neuron where a current connection is located to the input neuron where the previous connection is located, therefore the selected input neurons for computing the output neuron $O_j$ are $I_{k_1}, I_{k_2}, \ldots, I_{k_n}$, and corresponding weights are $W_{k_1j}, W_{k_2j}, \ldots, W_{k_nj}$, where $k_1=A_1+1$, $k_p=A_p+k_{p-1}$.

14. The operation method of claim 9, further comprising: storing, by a storage circuit, data and an instruction, where the data stored in the storage circuit includes:

the feature map composed of the input neuron, the weight, the connection array of the feature map composed of the output neuron and the input neuron, the connection array of each row in the feature map composed of the output neuron and the input neuron, the connection array of each column in the feature map composed of the output neuron and the input neuron, the feature map composed of the output neuron, and other data and parameters required for the artificial neural network operation.

15. The operation method of claim 9, wherein the operation circuit includes:

a first part: a multiplier configured to multiply first input data and second input data to obtain a product, a second part: one or a plurality of adders configured to add the product step by step to obtain a sum, where bias processing is or is not performed on the sum as needed, and a third part: an activation function configured to perform an activation operation on the sum to obtain an output neuron.

16. The operation method of claim 9, further comprising: caching, by a caching circuit, data and an instruction, wherein the caching circuit includes:

an input caching circuit configured to cache the input data and instructions; and an output caching circuit configured to cache the output neuron, wherein the input caching circuit includes:

an instruction caching circuit configured to store a dedicated instruction;

a weight caching circuit configured to cache the weight; and an input neuron caching circuit configured to cache the input neuron.

17. The operation method of claim 16, further comprising:

reading, by a control circuit, the dedicated instruction from the instruction caching circuit, decoding the dedicated instruction to an operation instruction, and inputting the operation instruction to an operation circuit;

reading/writing, by a DMA (direct memory access) circuit, data or instruction in a storage circuit, the instruction caching circuit, the weight caching circuit, the input neuron caching circuit, and the output neuron caching circuit, and transmitting the connection array to the filtering circuit; wherein the connection array of the feature map composed of the output neuron and the input neuron is transmitted from the storage circuit to the filtering circuit by the DMA circuit; the input neuron is sequentially transmitted from the storage circuit to the filtering circuit via the DMA circuit and the input neuron caching circuit; and the weight is sequentially transmitted from the storage circuit to the filtering circuit via the DMA circuit and the weight caching circuit.

18. The operation method of claim 9, wherein the artificial neural network operation performed in the operation circuit includes:

multiplying, by a multiplier, first input data and second input data to obtain a product;

adding, by one or a plurality of adders, the product step by step to obtain a sum, where bias processing is or is not performed on the sum as needed; and performing, by an activation function, an activation operation on the sum to obtain an output neuron.

19. An electronic device, comprising:

an operation device that includes:

a filtering circuit configured to select a feature map and a weight corresponding to the feature map participating in subsequent operations according to a connection array of the feature map composed of the output neuron and an input neuron, and output the feature map and the weight corresponding to the feature map to an operation circuit; and/or configured to select a row of the feature map and a row of weight corresponding to the row of the feature map according to a connection array of each row in the feature map composed of an output neuron and an input neuron, and output the row of the feature map and the row of weight corresponding to the row of the feature map to the operation circuit; and/or configured to select a column of the feature map and a weight column corresponding to the column of the feature map according to a connection array of each column in the feature map composed of an output neuron and an input neuron, and output the column of the feature map and the weight column of the column of the feature map to an operation circuit; and the operation circuit configured to perform a corresponding artificial neural network operation supporting structure clipping on data output by the filtering circuit according to an instruction to obtain an output neuron, wherein a selecting process of the filtering circuit includes:

if the weight has not been selected offline, selecting out the feature map and a corresponding weight of the feature map according to the connection array of the feature map composed of the output neuron and the input neuron, and outputting the selected feature map and a corresponding weight of the feature map to the operation circuit and/or selecting out a row/column of the feature map and a corresponding row/column of the weight according to a connection array of row/column of the feature map composed of the output neuron and the input neuron, and outputting the selected row/column of the feature map and the corresponding row/column of the weight to the operation circuit; and if the weight has been selected offline, selecting out the feature map according to the connection array of the feature map composed of the output neuron and the input neuron, outputting the selected feature map to the operation circuit, and directly outputting the weight after selecting offline to the operation circuit without passing by the filtering circuit at the same time; and/or selecting the row/column of the feature map and the corresponding row/column of the weight according to the connection array of row/column of the feature map composed of the output neuron and the input neuron, and outputting the selected row/column of the feature map and the corresponding row/column of the weight to the operation circuit.

* * * * *